United States Patent
Bhide et al.

(10) Patent No.: US 12,417,493 B2
(45) Date of Patent: Sep. 16, 2025

(54) SYSTEM AND METHODS FOR EVALUATING THE SENSITIVITY AND FAIRNESS BOUNDS OF TREE-BASED MODELS

(71) Applicant: International Business Machines Corporation, Armonk, NY (US)

(72) Inventors: Manish Anand Bhide, Hyderabad (IN); Ravi Chandra Chamarthy, Hyderabad (IN); Trent A. Gray-Donald, Ottawa (CA); Remus Lazar, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 18/058,344

(22) Filed: Nov. 23, 2022

(65) Prior Publication Data

US 2024/0169427 A1   May 23, 2024

(51) Int. Cl.
*G06F 16/22* (2019.01)
*G06Q 40/03* (2023.01)

(52) U.S. Cl.
CPC ......... *G06Q 40/03* (2023.01); *G06F 16/2246* (2019.01)

(58) Field of Classification Search
CPC .................. G06Q 40/03; G06F 16/2246
See application file for complete search history.

(56) References Cited

U.S. PATENT DOCUMENTS 9,372,736 B2 * 6/2016 Curbera ............... G06Q 10/04
10,902,062 B1 * 1/2021 Guha .................. G06F 16/9027
(Continued)

FOREIGN PATENT DOCUMENTS

CN   108416368 A  *  8/2018  .......... G06K 9/6256
CN   114419379 A      4/2022

OTHER PUBLICATIONS

Krishna, et al., "Measuring Fairness of Text Classifiers via Prediction Sensitivity," arXiv:2203.08670v1 [cs.LG] Mar. 16, 2022.
(Continued)

*Primary Examiner* — James E Richardson
(74) *Attorney, Agent, or Firm* — Amin, Turocy & Watson, LLP

(57) ABSTRACT

One or more systems, devices, computer program products and/or computer-implemented methods of use provided herein relate to a process to facilitate abnormal document self-discovery. A system can comprise a memory that stores computer executable components, and a processor that executes the computer executable components stored in the memory, wherein the computer executable components can comprise a fairness component, an identification component, a removal component, and an evaluation component. The fairness component can receive a dataset for a tree-based model and calculates a first fairness, and the identification component can identify root to leaf paths in the tree-based model for one or more records of the dataset and one or more corresponding perturbed records. The removal component can remove at least one record of the one or more records having similar root to leaf paths to the other records of the one or more records.

20 Claims, 12 Drawing Sheets

(56) References Cited

U.S. PATENT DOCUMENTS

| | | | | |
|---|---|---|---|---|
| 11,720,962 | B2* | 8/2023 | Kamkar | G06Q 40/03 |
| | | | | 705/38 |
| 2020/0082299 | A1* | 3/2020 | Vasconcelos | G06N 20/00 |
| 2021/0073287 | A1* | 3/2021 | Hunter | H04L 67/133 |
| 2021/0158076 | A1* | 5/2021 | Lohia | G06N 5/045 |
| 2021/0224605 | A1* | 7/2021 | Zhang | G06N 20/00 |
| 2022/0076080 | A1 | 3/2022 | Hacmon et al. | |
| 2022/0222238 | A1* | 7/2022 | Herrema, III | G06F 16/2365 |
| 2023/0117554 | A1* | 4/2023 | Srivastava | G06F 16/2264 |
| | | | | 705/37 |

OTHER PUBLICATIONS

Kaminski, et al., "A framework for sensitivity analysis of decision trees," Published online: May 24, 2017, CEJOR (2018) 26:135-159, https://doi.org/10.1007/s10100-017-0479-6.

Perera, et al., "Search-based fairness testing for regression-based machine learning systems," Empirical Software Engineering (2022) 27: 79, https://doi.org/10.1007/s10664-022-10116-7, Published online: Mar. 30, 2022.

Wu, et al., "On Convexity and Bounds of Fairness-aware Classification," 2019 IW3C2 (International World Wide Web Conference Committee), WWW '19, May 13-17, 2019, San Francisco, CA, USA, published under Creative Commons CC-BY 4.0 License, https://doi.org/10.1145/3308558.3313723.

Ranzato, et al., "Fairness-Aware Training of Decision Trees by Abstract Interpretation," In Proceedings of the 30th ACM International Conference on Information and Knowledge Management (CIKM '21), Nov. 1-5, 2021, Virtual Event, QLD, Australia. ACM, NewYork, NY, USA, 10 pages. https://doi.org/10.1145/3459637.3482342.

Celis, et al., "Fair Classification with Adversarial Perturbations," arXiv:2106.05964v2 [cs.LG] Nov. 23, 2021.

* cited by examiner

← 300

| Data Type | Age | Credit Rating | Prediction |
|---|---|---|---|
| Original Data A | 20 | Poor | Loan Denied |
| Perturbed Data A | 45 | Poor | Loan Denied |
| Original Data B | 50 | Good | Loan Approved |
| Perturbed Data B | 22 | Good | Loan Approved |

← 302

| Data Type | Feature A | Feature B | Feature C |
|---|---|---|---|
| Original Data R1 | 5 | Attribute 1 | 8 |
| Perturbed Data R1' | 5 | Attribute 2 | 8 |
| Original Data R2 | 8 | Attribute 1 | 3 |
| Perturbed Data R2' | 8 | Attribute 2 | 3 |

FIG. 3

| Original Record | Original Outcome | Perturbed Record Prediction | Effect |
|---|---|---|---|
| Minority | Unfavorable | Favorable | Perturbed record amplifies bias |
| Minority | Unfavorable | Unfavorable | Perturbed record reduces bias |
| Minority | Favorable | Favorable | Perturbed record reduces bias |
| Minority | Favorable | Unfavorable | Perturbed record amplifies bias |
| Majority | Unfavorable | Favorable | Perturbed record amplifies bias |
| Majority | Unfavorable | Unfavorable | Perturbed record reduces bias |
| Majority | Favorable | Favorable | Perturbed record reduces bias |
| Majority | Favorable | Unfavorable | Perturbed record amplifies bias |

FIG. 7

SYSTEM AND METHODS FOR EVALUATING THE SENSITIVITY AND FAIRNESS BOUNDS OF TREE-BASED MODELS

BACKGROUND

One or more embodiments described herein relate generally to evaluating the sensitivity and fairness bounds of tree-based models via path-based generation and data perturbation. Embodiments relate to perturbing records of a dataset and monitoring a data drift of the tree-based models if the model is determined to be sensitive to fairness, and more specifically, to systems and method to facilitate evaluating the sensitivity and fairness bounds.

SUMMARY

The following presents a summary to provide a basic understanding of one or more embodiments described herein. This summary is not intended to identify key or critical elements or delineate any scope of the particular embodiments or any scope of the claims. The sole purpose of the summary is to present concepts in a simplified form as a prelude to the more detailed description that is presented later. In one or more embodiments described herein, systems, devices, computer-implemented methods, and/or computer program products that facilitate evaluating the sensitivity and fairness bounds of tree-based models are described.

According to an embodiment, a system can comprise a memory that stores computer executable components and a processor that executes the computer executable components stored in the memory. The computer executable components can include a fairness component, an identification component, a removal component, and an evaluation component. The fairness component can receive a dataset for a tree-based model and can calculate a first fairness of the dataset. Additionally, the identification component can identify root to leaf paths in the tree-based model for one or more records of the dataset and one or more corresponding perturbed records. The removal component can remove at least one record of the one or more records having similar root to leaf paths to other records of the one or more records. Further, the evaluation component can evaluate a sensitivity of the tree-based model based on the first fairness and a second fairness; wherein, the fairness component can determine the second fairness of the dataset without the removed at least one record.

According to another embodiment, a computer-implemented method of evaluating the sensitivity of a tree-based model, can comprise receiving, using a processor operatively coupled to memory, a dataset for a tree-based model. Additionally, the computer-implemented method can comprise calculating a first fairness. The computer-implemented method can comprise identifying, using the processor, root to leaf paths in the tree-based model for one or more records of the dataset and one or more corresponding perturbed records. Additionally, the computer-implemented method can include, removing, using the processor, at least one record of the one or more records having similar root to leaf paths to other records of the one or more records. The computer-implemented method can include evaluating, using the processor, the sensitivity of the tree-based model based on the first fairness and a second fairness, wherein the second fairness is determined without the at least one removed record.

According to yet another embodiment, a computer program product for evaluating the sensitivity of a tree-based model, the computer program product can comprise a computer readable storage medium having program instructions embodied therewith, the program instructions executable by a processor can cause the processor to receive a dataset for a tree-based model and can calculate a first fairness. The computer program product can identify, using the processor, root to leaf paths in the tree-based model for one or more records of the dataset and one or more corresponding perturbed records. Additionally, the computer program product can remove, using the processor, at least one record of the one or more records having similar root to leaf paths to other records of the one or more records. The computer program product can evaluate, using the processor, the sensitivity of the tree-based model based on the first fairness and a second fairness, wherein the second fairness can be determined without the at least one removed record.

DESCRIPTION OF THE DRAWINGS

FIG. 3 illustrates tables of an example, non-limiting system that can facilitate evaluating the sensitivity and fairness bound of a tree-based model via data perturbation, in accordance with one or more embodiments described herein.

FIG. 7 illustrates a table of an example, non-limiting dataset sorted by the effect on bias for the tree-based model, in accordance with one or more embodiments described herein.

DETAILED DESCRIPTION

The following detailed description is merely illustrative and is not intended to limit embodiments or application or uses of embodiments. Furthermore, there is no intention to be bound by any expressed or implied information presented in the preceding Background or Summary sections, or in this Detailed Description section.

In some cases, it can be desirable to evaluate a dataset to determine a sensitivity of the model and fairness bounds of the model. Fairness can be measured based on one or more of a variety of test/payload data (e.g., a dataset). Such techniques can be limited to depend on the data used for a model. In instances where the records of the dataset are similar to each other, it can be challenging to obtain an accurate picture of the model fairness. For example, in instances where a dataset includes 100 data points, 97 of the 100 data points can be close to each other and share similar characteristics; further, the behavior of the 97 data points can become amplified within the model. In such a case, the model can provide good results on the dataset (e.g., test data), but the fairness of the overall model can still be poor when the model is deployed into production.

Nonetheless, even though results can be provided, a problem associated with sensitivity and fairness bounds evaluation systems and methods, is that they lack the desired robustness and customization to determine test data sensitivity to fairness, as well as determining the upper and lower bounds on fairness for tree-based models at the production stage. Given these problems, one or more embodiments described herein can be implemented to produce a solution to one or more of these problems in the form of systems, computer-implemented methods, and/or computer program products that can facilitate the following processes: i) receiving, using a processor operatively coupled to memory, a dataset for a tree-based model; ii) identifying, using the processor, root to lead paths in the tree-based model for one or more records of the dataset and one or more corresponding perturbed records; iii) removing, using the processor, at least one record of the one or more records having similar root to leaf paths to other records of the one or more records; and iv) evaluating, using the processor, the sensitivity of the tree-based model based on the first fairness and a second fairness calculated without the at least one removed record. That is, embodiments described herein include one or more systems, computer implemented methods, apparatuses and/or computer program products that can facilitate one or more of the aforementioned processes.

Figure 1:
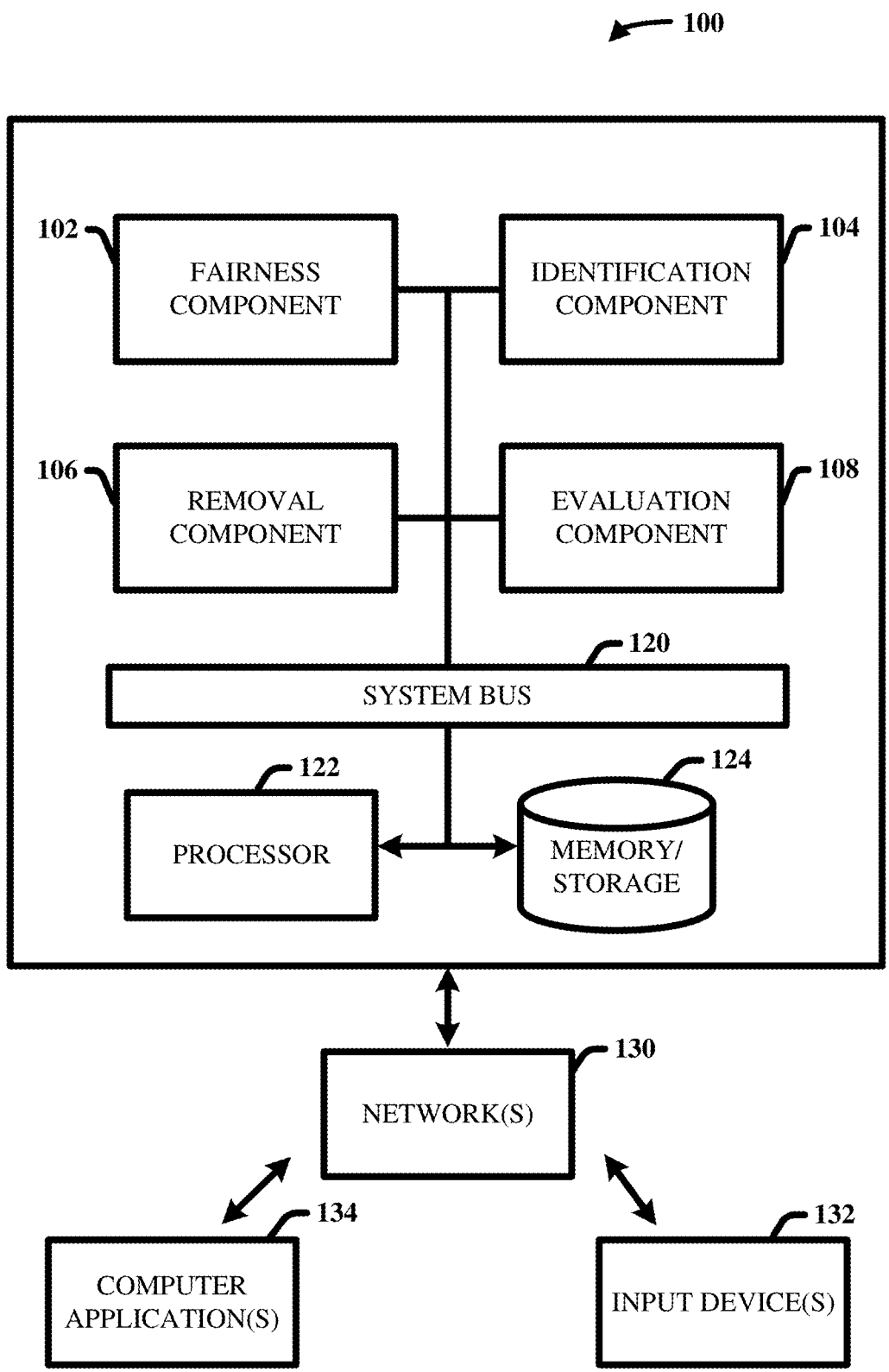
FIG. 1 illustrates a block diagram of an example, non-limiting system that can facilitate evaluating the sensitivity and fairness bounds of a tree-based model, in accordance with one or more embodiments described herein.

FIG. 1 illustrates a block diagram of an example, non-limiting system 100 that comprises a fairness component 102, an identification component 104, a removal component 106, and an evaluation component 108. Additionally, the fairness component 102 can receive a dataset 110 (see, e.g., FIG. 2) including information (e.g., data) for a tree-based AI model (e.g., decision tree, random forest, XGBoost, etc.) that can be connected with the fairness component 102 or connected indirectly via input device(s) 132. Additionally, the fairness component 102 can calculate a first fairness (F1) for the dataset 110. The identification component 104 can identify root to leaf paths in the tree-based model for one or more records of the dataset 110 and one or more corresponding perturbed records. The removal component 106 can remove records of the one or more records that have similar root to leaf paths to other records of the one or more records. Further, the evaluation component 108 can evaluate a sensitivity of the tree-based model based on the first fairness (F1) and a second fairness (F2). The second fairness (F2) can be determined of the dataset 110 without the removed records.

Additionally, the evaluation component 108 can monitor a data drift of the tree-based model if the evaluation component 108 determines that the tree-based model is sensitive to fairness. Further, the tree-based model can be considered to be sensitive to fairness when the difference between the first fairness and the second fairness is above a set threshold which can be set by a user operating the system 100 (e.g., which can be substantially large). For example, the threshold can be about 0.8 or more or less. For embodiments resulting in a Repetitive description of like elements employed in other embodiments described herein is omitted for sake of brevity. Aspects of systems (e.g., the sensitivity and fairness bounds evaluation system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Additional description of functionalities will be further described below with reference to the example embodiments of FIGS. 1 and 2, where repetitive description of like elements and/or processes employed in respective embodiments is omitted for sake of brevity. The sensitivity and fairness bounds evaluation system 100 can facilitate: i) receiving, using a processor 122 operatively coupled to memory, a dataset 110 for a tree-based model and calculating the first fairness (F1); ii) identifying, using the processor 122, root to leaf paths in the tree-based model for one or more records of the dataset and one or more corresponding perturbed records; iii) removing, using the processor 122, at least one record of the one or more records having similar root to leaf paths to other records of the one or more records; and iv) evaluating, using the processor 122, the sensitivity of the tree-based model based on the first fairness (F1) and the second fairness (F2), wherein the second fairness (F2) can be calculated of the dataset 110 without the removed record. Further, the sensitivity and fairness bounds evaluation system 100 can facilitate monitoring, using the processor 122, a data drift of the tree-based model if the tree-based model is determined to be sensitive to fairness. Perturbed records can be records of which a protected attribute changed in an opposite direction (e.g., includes an opposite value for the protected attribute).

The fairness component 102 can be operatively linked with the identification component 104, the removal component 106, and the evaluation component 108 such as to evaluate the sensitivity and fairness bounds of the tree-based model. The sensitivity and fairness bounds evaluation system 100 can be connected with a system bus 120, a processor 122, a memory/storage component 124, one or more networks 130, one or more input devices 132, and one or more computer application 134, which can be associated with cloud computing environment 1000 (FIG. 10).

Figure 2:
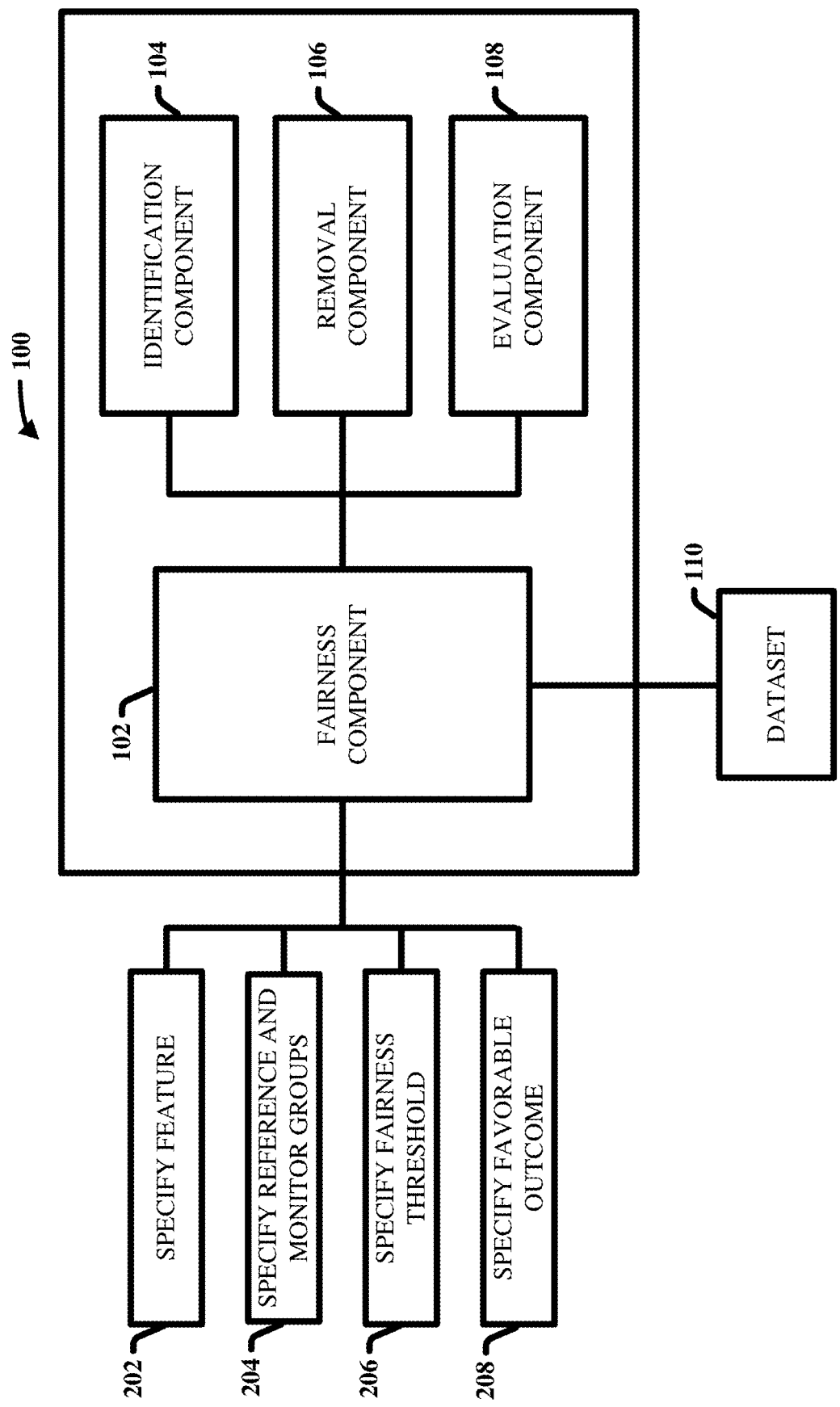
FIG. 2 illustrates a block diagram of an example, non-limiting system that can facilitate evaluating the sensitivity and fairness bounds of a tree-based model, in accordance with one or more embodiments described herein.

In embodiments, FIGS. 1 and 2 illustrate block diagrams of an example, non-limiting sensitivity and fairness bounds evaluation system 100 that can address the challenges of evaluating fairness in accordance with one or more embodiments described herein. The sensitivity and fairness bounds evaluation system 100 can receive fairness information from a user operating the system 100 or interacting with the system 100. The fairness information can include the user specifying: a protected feature to monitor 202; a reference group and monitor group 204; a fairness threshold 206, and a favorable outcome 208. The sensitivity and fairness bounds evaluation system 100 can receive the fairness information from the user to direct evaluation of the tree-based model. Additionally, the identification component 104, the removal component 106, and the evaluation component 108 can receive the fairness information to consider when executing operations associated with the respective components.

Further, the user information can result in a user-configured fairness monitor that tracks disparate impact of the dataset 110. Reeving the features to monitor 202 can result in the system 100 monitoring the tree-based model's propensity for a favorable outcome for one feature over another feature. Receiving the reference group and monitor group can allow the system 100 to check for potential bias between the reference group and the monitor group. Receiving the fairness threshold can facilitate alerting the user when the fairness of the tree-based model drops below an acceptable level (e.g., set by the user). Receiving the favorable outcomes can allow the system 100 to calculate the percentage of records that receive the specified outcome.

With embodiments, the sensitivity and fairness bounds evaluation system 100 can calculate a disparate impact for a tree-based model to compare with the user-specified fairness threshold. The disparate impact of the tree-based model can be calculated by:

$$\text{Disperate impact} = \frac{\text{Ratio of favorable outcome of minority}}{\text{Ratio of favorable outcome of majority}}.$$

Further, the user can set the fairness threshold to a desired value (e.g., about 0.8 or more or less) that reflects a desired fairness of the tree-based model. Disparate impact can be calculated from one or more of a variety of datasets 110. For example and without limitation, the dataset 110 can include information regarding loan approvals. For a dataset 110 of 30% of a first group of individuals were approved for a home-loan, and 65% of a second group of individuals were also approved for a home-loan. Calculating the desperate impact of the dataset 110 comprises $$\frac{30\%}{65\%} = 0.46.$$

In such a case, the resulting disparate impact value (0.46) is less than the allowable fairness threshold; therefore, the dataset 110 contains disparate impact and the dataset can be sensitive to fairness.

In embodiments, such as illustrated in FIG. 3, the sensitivity and fairness bounds evaluation system 100 can receive the following data: i) users in the age range of 18-25 have a poor credit rating; ii) the percentage of favorable outcomes for the minority group (e.g., age range of 18-25 as specified by the user) as 0%; iii) the percentage of favorable outcomes for the majority group (e.g., age range 26-99) as 40%; and iv) a disparate impact ratio of zero. Further, the sensitivity and fairness bounds evaluation system 100 can perturb the dataset 110. Perturbing the dataset 110 can include changing the value of the fairness attribute as shown by table 300 of FIG. 3. Table 300 includes original data (e.g., records) and corresponding perturbed records. Perturbed records include a different age group than the original such as to evaluate the dataset 110 with respect to age compared to credit rating (e.g., good or poor).

With embodiments, such as generally illustrated in FIG. 3, table 302 represents a sample dataset 110 used in connection with the sensitivity and fairness bounds evaluation system 100 including original data (e.g., record) and perturbed data (e.g., record). For example and without limitation, the perturbed record can include an opposite value for Feature B of the dataset 110. In further examples, the original record R1 can include first attribute values for Feature B (e.g., attribute values can be one or more of a variety of identifying features/attributes for an individual or group) and the corresponding perturbed record includes second attribute values for Feature B that are different than the first attribute values.

Figure 4:
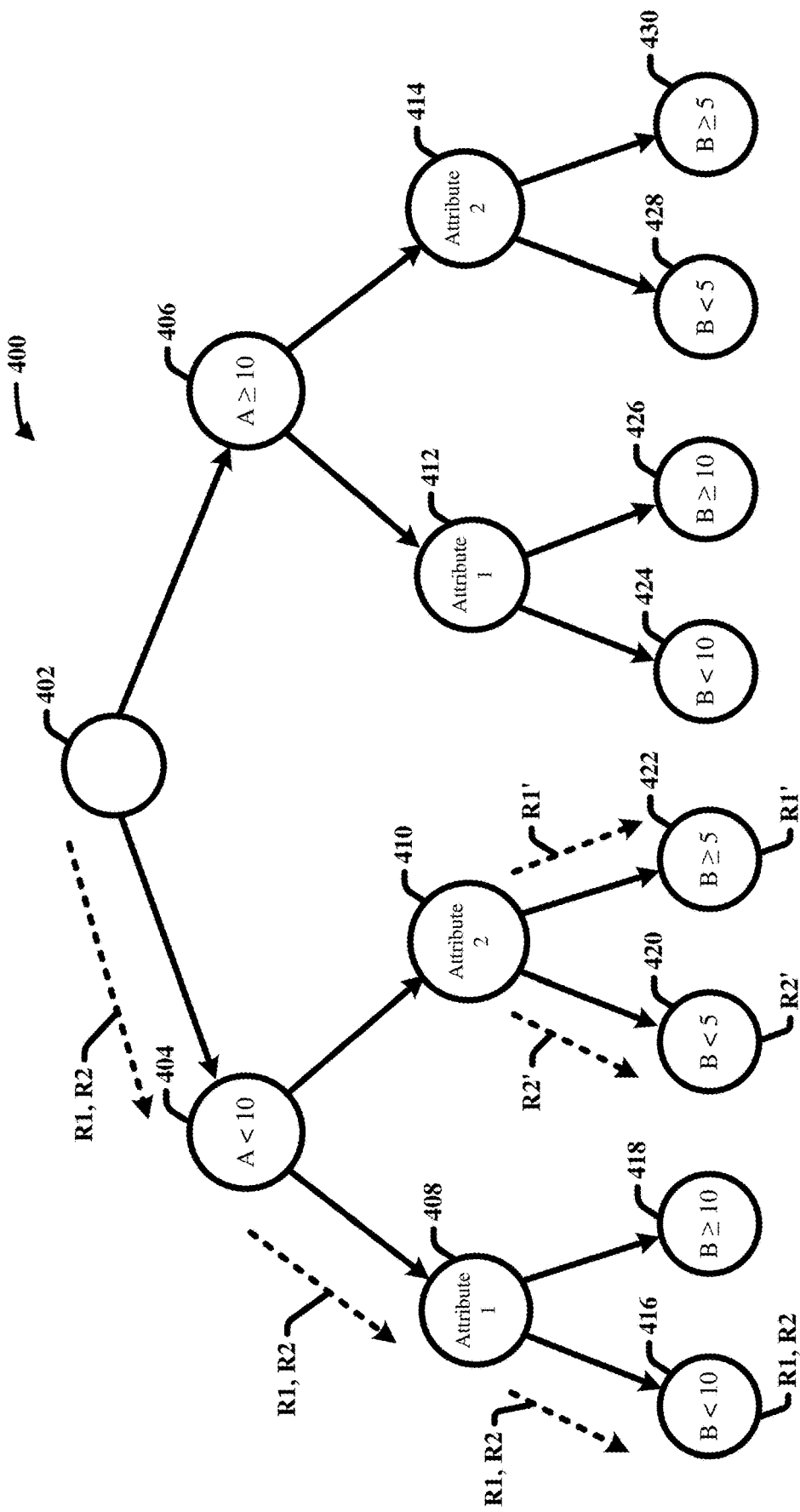
FIG. 4 illustrates a diagram of an example, non-limiting tree-based model that can be utilized to facilitate data perturbation, in accordance with one or more embodiments described herein.

Turning now to FIG. 4, the sensitivity and fairness bounds evaluation system 100 can receive a dataset 110 for a tree-based model 400 and can calculate a first fairness of the dataset 110 via the disparate impact equation discussed above. With embodiments, the tree-based model 400 can include one or more nodes 402, 404, 406, 408, 410, 412, 414, 416, 418, 420, 422, 424, 426, 428, 430 corresponding to the received dataset 110. The identification component 104 can identify root to leaf paths of the original record. Additionally, the identification component 104 can identify root to leaf paths in the tree-based model 400 for one or more records of the dataset 110; and the identification component 104 can generate a data point for each identified path. In embodiments, the identification component 104 can perturb an attribute of the data points (e.g., such as illustrated by table 302). The identification component 104 can additionally identify the root to leaf path taken by the perturbed records.

In examples, when processing the dataset 110 (e.g., the original records and the perturbed records) the removal component 106 can remove one or more records from the dataset 110 to calculate a second fairness (F2). With embodiments, the removal component 106 can remove records from the dataset 110 if the path by the original record and the path followed by the perturbed record have already been seen by some other record in the dataset 110. Just because an original record R1 follows the same root to leaf path as another original record R2, does not mean that the perturbed record of R1 (R1') will have the same path as the perturbed record of R2 (R2'), and such can be seen from the tree-based model 400 illustrated in FIG. 4. Original records R1 and R2 stem from node 416; however, perturbed records R2' and R1' stem from nodes 420 and 422, respectively. Following the removal of records and/or perturbed records, the fairness component 102 can calculate the second fairness (F2) of the dataset 110 without the removed records in the dataset 110 (e.g., via the removal component 106). Additionally, the evaluation component 108 can evaluate the sensitivity of the tree-based model 400 by comparing the first fairness (F1) and the second fairness (F2). The tree-based model 400 can be considered sensitive to fairness if the difference between the first fairness (F1) and the second fairness (F2) is above the set threshold (e.g., a threshold selected by the user). In some examples, the threshold can be a value of about 0.2 and in other examples, a value of about 0.8, depending on the user input.

Figure 5:
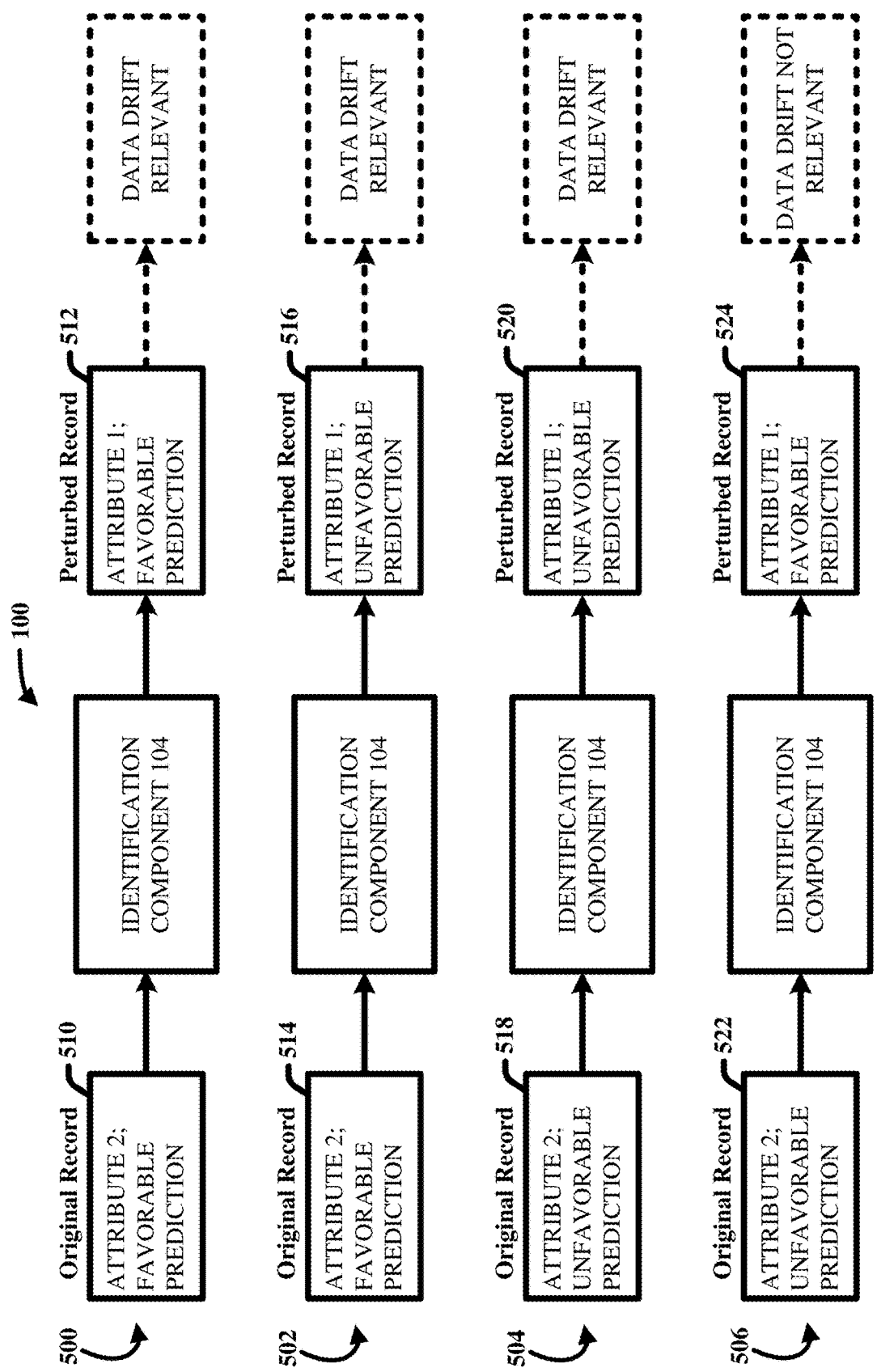
FIG. 5 illustrates a block diagram of an example, non-limiting system that can facilitate determining data drift constraints for the dataset, in accordance with one or more embodiments described herein.

Turning now to FIG. 5, in embodiments, the sensitivity and fairness bounds evaluation system 100 (e.g., the fairness component 102, the identification component 104, the removal component 106, and the evaluation component 108) can monitor the data drift of the dataset 110 after determining that the dataset 110 is sensitive to fairness. The evaluation component 108 can compute data drift constraints/distribution using records in the dataset 110. Further, the computation of data drift constraints can be executed via the top-k paths in the tree-based model 400. Such top-k paths are likely to have a significant impact on fairness (F1, F2). The evaluation component 108 can monitor the data drift focused on fairness (e.g., specialized data drift). The evaluation component 108 can determine whether perturbing records improve or drop fairness in the dataset 110.

FIG. 5 illustrates a first example 500, a second example 502, a third example 504, and a fourth example 506 of finding data drift constraints for four original records 510, 514, 518, 522 and four corresponding perturbed records 512, 516, 520, 524 of the dataset 110. Turning to the first example 500 and the second example 502, the identification component 104 can determine that original records 510, 514 and perturbed records 512, 516 improve fairness in the dataset 110. Further, the identification component 104 can determine that if the number of records that match the pattern in production changes (for the first example 500 and second example 502), the resulting effect can either reduce the fairness or the fairness can remain the same; thus, indicating that the data drift is relevant. With respect to the third example 504, the identification component 104 can determine that the original records 518 and the perturbed records 520 do not have an impact on fairness. Further, the identification component 104 can determine that if the number of records that match the pattern from the third example 504 changes, the resulting effect can either improve or drop in fairness; thus, indicating that the data drift is relevant. Turning to the fourth example 506, the identification component 104 can determine that the original records 522 and the perturbed records 524 resulted in drop in fairness.

Further, the identification component 104 can determine that if the number of records that match the pattern from the fourth example 506 changes, the resulting effect can lead to fairness improving or remaining the same; thus, indicating that the data drift is not relevant. In embodiments, the sensitivity and fairness bounds evaluation system 100 can generate flags associated with the data drift constraints of the first example 500, the second example 502, the third example 504, and the fourth example 506. For example and without limitation, if the data drift constraints are violated in production, the fairness component 102 and the identification component 104 can generate a fairness drift alert (e.g., via audio, visual, etc.) to the user.

Figure 6A:
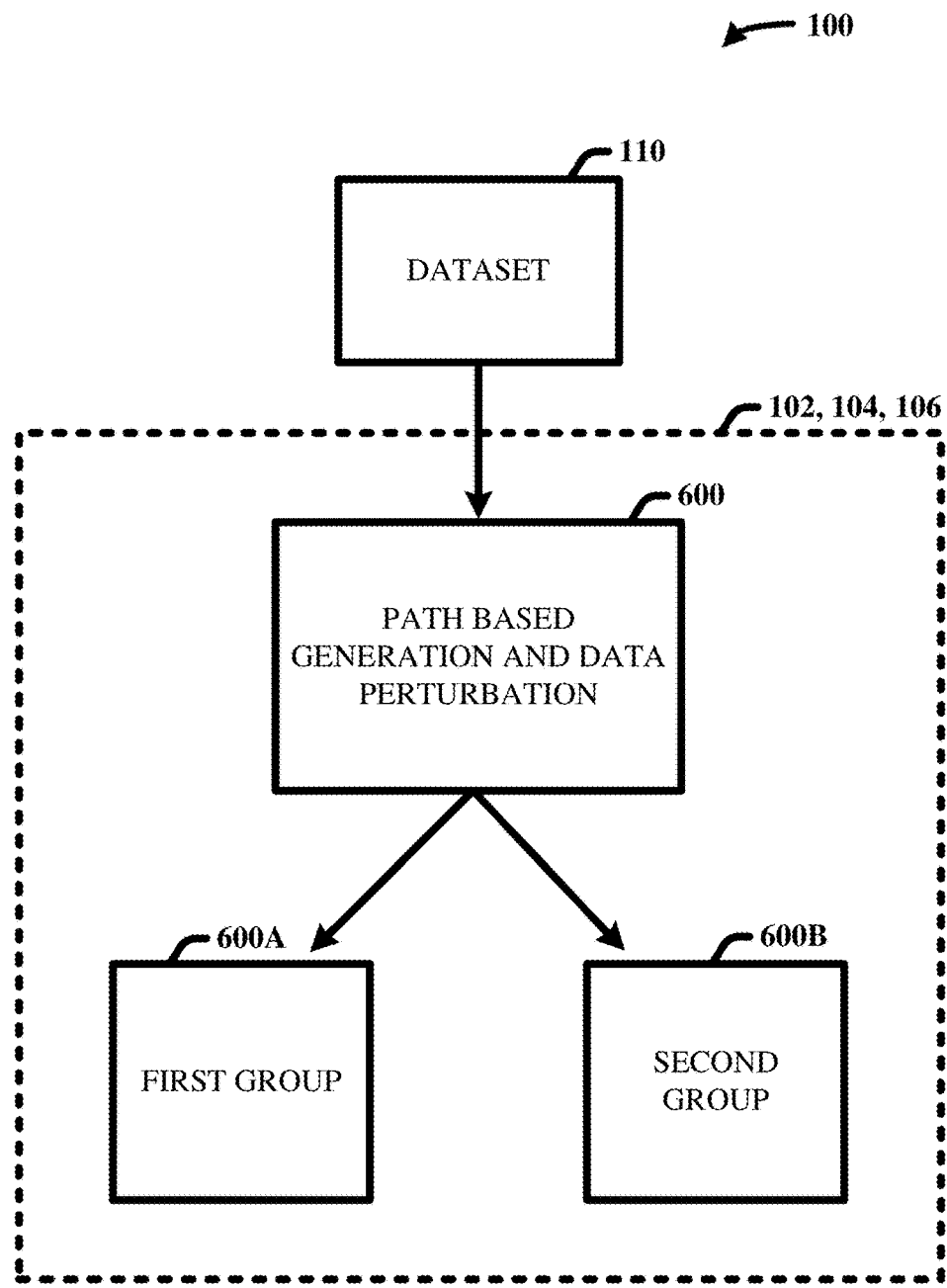
FIG. 6A illustrates a block diagram of an example, non-limiting system that can facilitate evaluating the sensitivity and fairness bounds of a tree-based model, in accordance with one or more embodiments described herein.
Figure 6B:
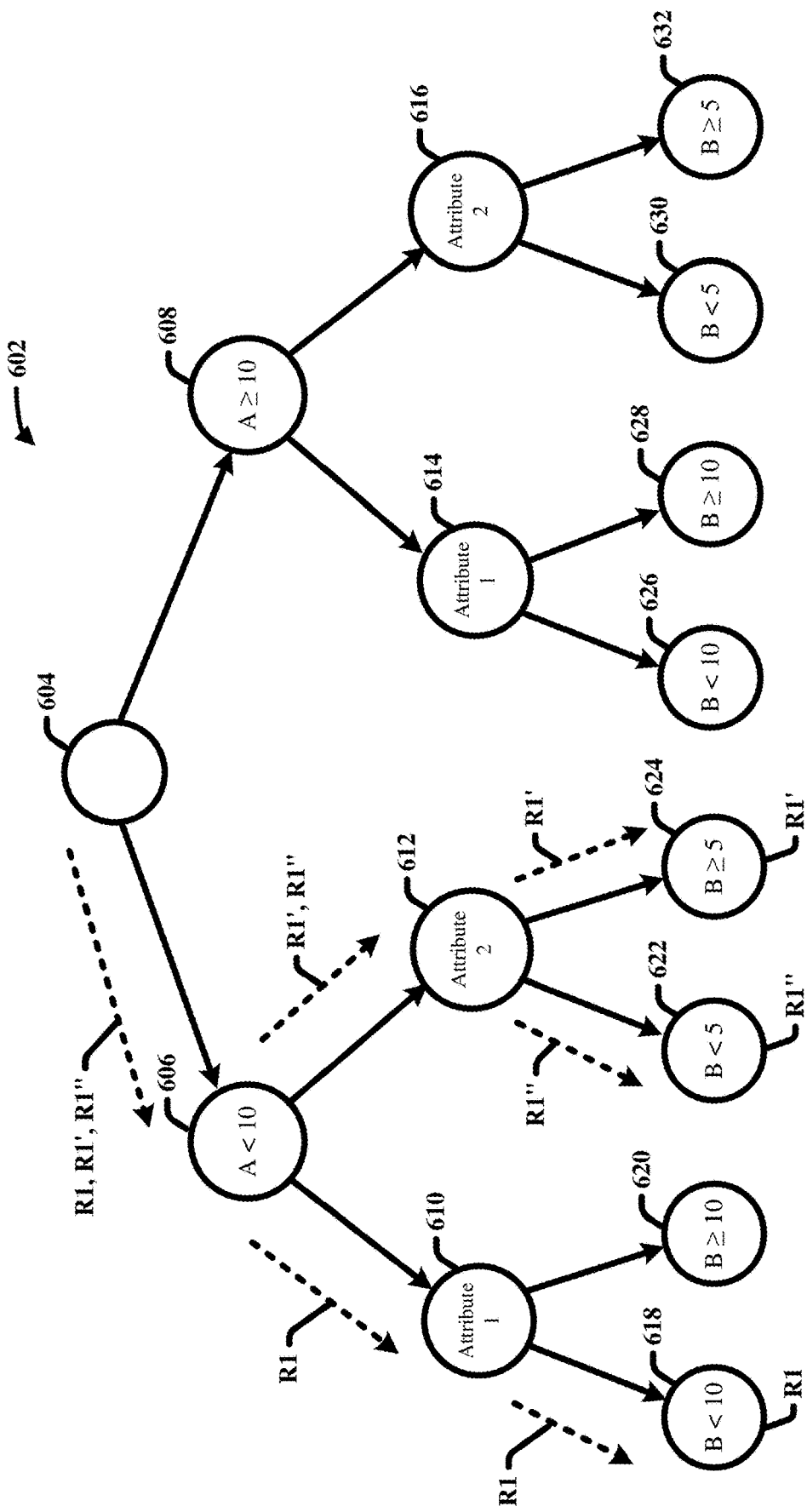
FIG. 6B illustrates a diagram of an example, non-limiting tree-based model that can be utilized to facilitate data perturbation, in accordance with one or more embodiments described herein.

With embodiments, such as generally illustrated by FIGS. 6A and 6B, the sensitivity and fairness bounds evaluation system 100 can determine the minimum and the maximum fairness for the tree-based model 602 (e.g., including nodes 604, 606, 608, 610, 612, 614, 616, 618, 620, 622, 624, 626, 628, 630, 632). The system 100 can utilize path-based generation and data perturbation 600 to separate the perturbed records into groups for further processing. The fairness component 102 can find distinct paths from root to leaf in the tree-based model 602 (e.g., as indicated at dashed lines within FIG. 6B). Next, the fairness component 102 can generate a datapoint for each identified distinct path. The identification component 104 can perturb the fairness attribute of the datapoints by traversing from root to node where the fairness attribute is used. Such node can be considered the fairness decision node (e.g., node 606). The identification component 104 can find distinct paths that start from the fairness decision node and end with a leaf and can generate datapoints corresponding to the distinct paths as the perturbed records. In examples, the perturbed records can be grouped into a first group 600A and a second group 600B. Further, perturbed records can be grouped into the first group 600A if the prediction belongs to the same category as the corresponding original record. Perturbed records can be grouped into the second group 600B if the prediction belongs to a different category than the corresponding original record. In other words, if the original record had a favorable prediction, then the first group 600A will have perturbed records which also include a favorable outcome, and the second group 600B will include perturbed records that have an unfavorable outcome.

In embodiments, such as generally illustrated by FIG. 7, the sensitivity and fairness bounds evaluation system 100 can approximate a minimum fairness and a maximum fairness of the tree-based model 602. If the dataset 110 received by the tree-based model 602 is that after perturbation, it leads to amplification of bias, then the lowest possible bias in the data can be captured using such data. Further, if the dataset 110 received by the tree-based model 602 is that after perturbation, it does not lead to amplification of bias, then the highest possible bias in the data can be captured using such data. Table 700 of FIG. 7 illustrates separating the perturbed records by effect (e.g., whether the perturbed record amplifies bias 702 or reduces bias 704). From the set of perturbed records 702, a record can be selected that amplifies bias of the tree-based model 602. The lower bound on fairness (e.g., the minimum fairness) can be computed by creating a minimum dataset that has the original record and the selected perturbed record (amplifying bias) and computing the fairness for the minimum dataset. Additionally, the upper bound on fairness (e.g., the maximum fairness) can be computed by creating a maximum dataset that has the original record and the selected perturbed record (that does not amplify bias) and computing the fairness for the maximum dataset.

Figure 8A:
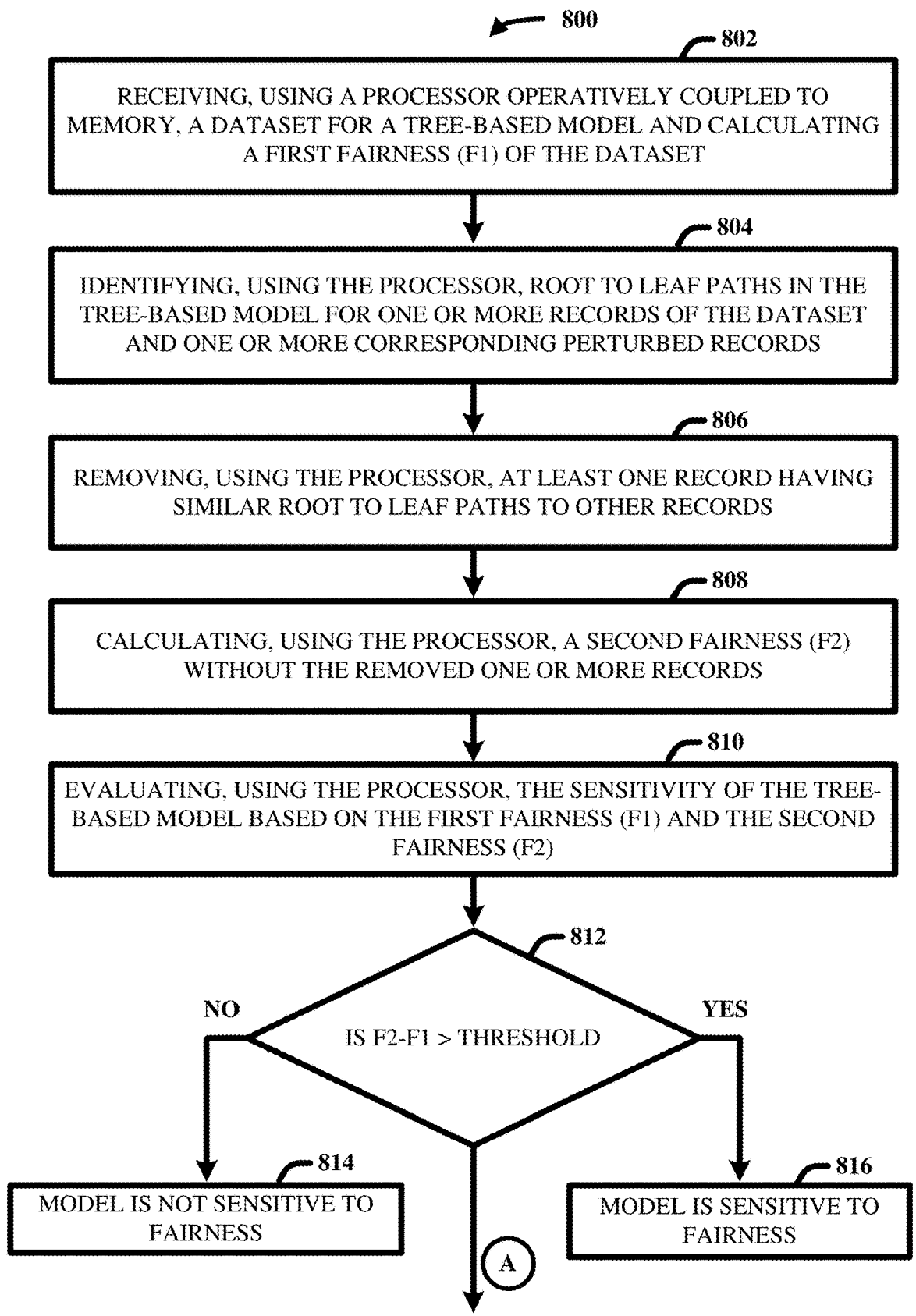
FIGS. 8A, 8B, and 8C illustrate flow diagrams of an example, non-limiting computer implemented method that can of evaluating sensitivity and fairness bounds of tree-based models, in accordance with one or more embodiments described herein.

With embodiments, such as generally illustrated by FIG. 8A, a computer-implemented method of evaluating sensitivity and fairness bounds of tree-based models 800 can comprise a first step of receiving, using the processor 122, a dataset 110 for a tree-based model 400 and calculating a first fairness (F1) of the dataset 110 (step 802). The computer-implemented method 800 can comprise identifying, using the processor 122, root to leaf paths in the tree-based model 400 for one or more records of the dataset 110 and one or more corresponding perturbed records. Additionally, the computer-implemented method of evaluating sensitivity and fairness bounds of tree-based models 800 can include removing, using the processor 122, at least one record having similar root to leaf paths to other records of the dataset 110 (step 806). Further, the computer-implemented method 800 can include calculating, using the processor 122, a second fairness of the dataset 110 without the removed one or more records (step 808). The computer-implemented method can also include evaluating, using the processor 122, the sensitivity of the tree-based model based on the first fairness and the second fairness (step 810).

In embodiments, the computer-implemented method of evaluating sensitivity and fairness bounds of tree-based models 800 can comprise determining whether the difference between the second fairness and the first fairness is greater than a threshold (e.g., determined by the user) (step 812). If the difference is greater than the threshold, the tree-based model 400 can be considered not to be sensitive to fairness (step 814). If the difference is less than the threshold, the tree-based model 400 can be considered as sensitive to fairness (step 816).

Figure 8B:
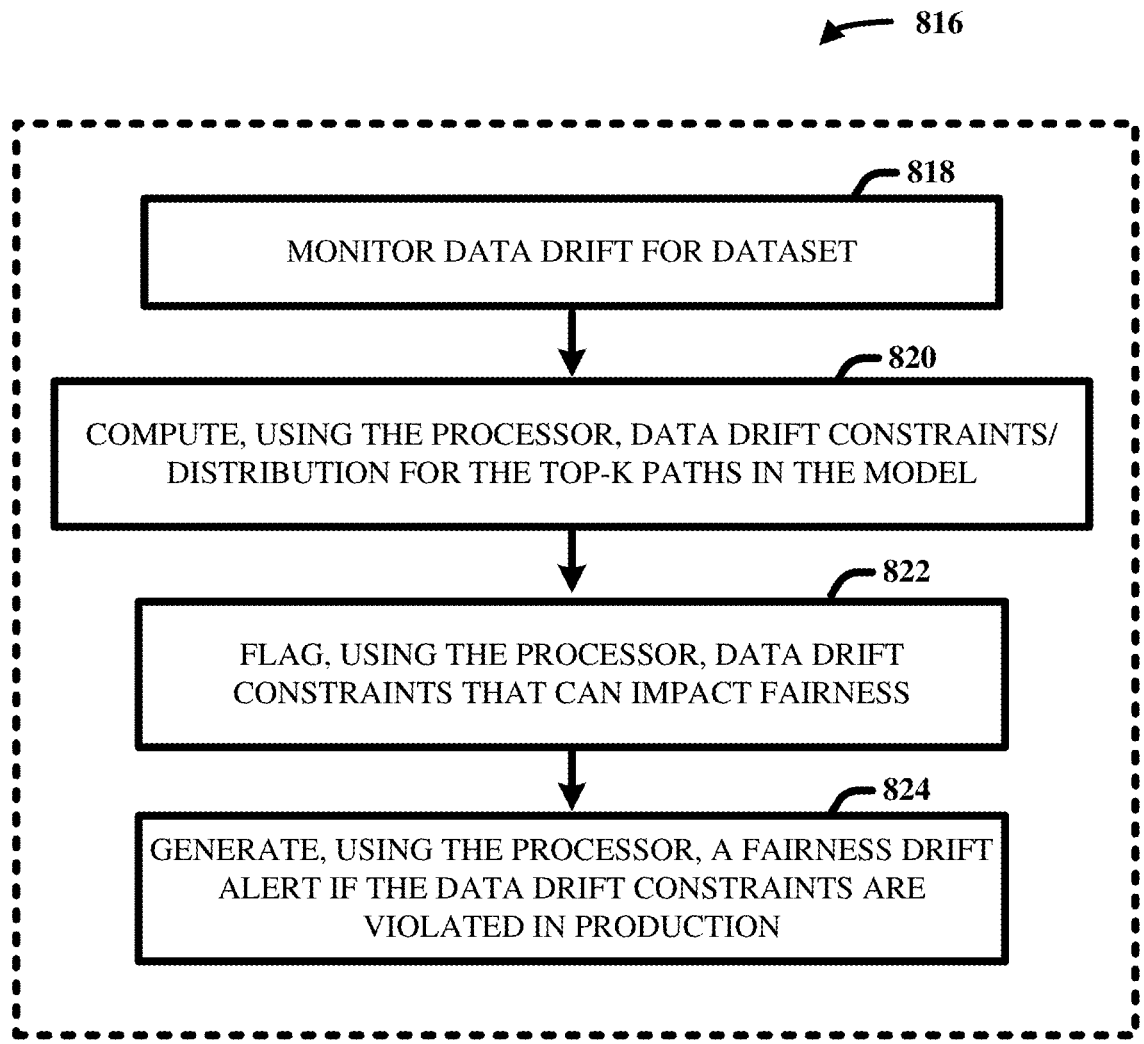

Further, such as generally illustrated by FIG. 8B, if the tree-based model is sensitive to fairness, the processor 122 can monitor the data drift for the dataset 110 (step 818). The computer-implemented method of evaluating sensitivity fairness bounds of tree-based models 800 can comprise computing, using the processor 122, data drift constraints/ distribution for the top-k paths in the tree-based model 400 (step 820). Additionally, the processor 122 can flag data drift constraints that can impact fairness of the tree-based model 400 (step 822). The computer-implemented method 800 can also include generating, using the processor 122, a fairness drift alert if the data drift constraints are violated in production.

Figure 8C:
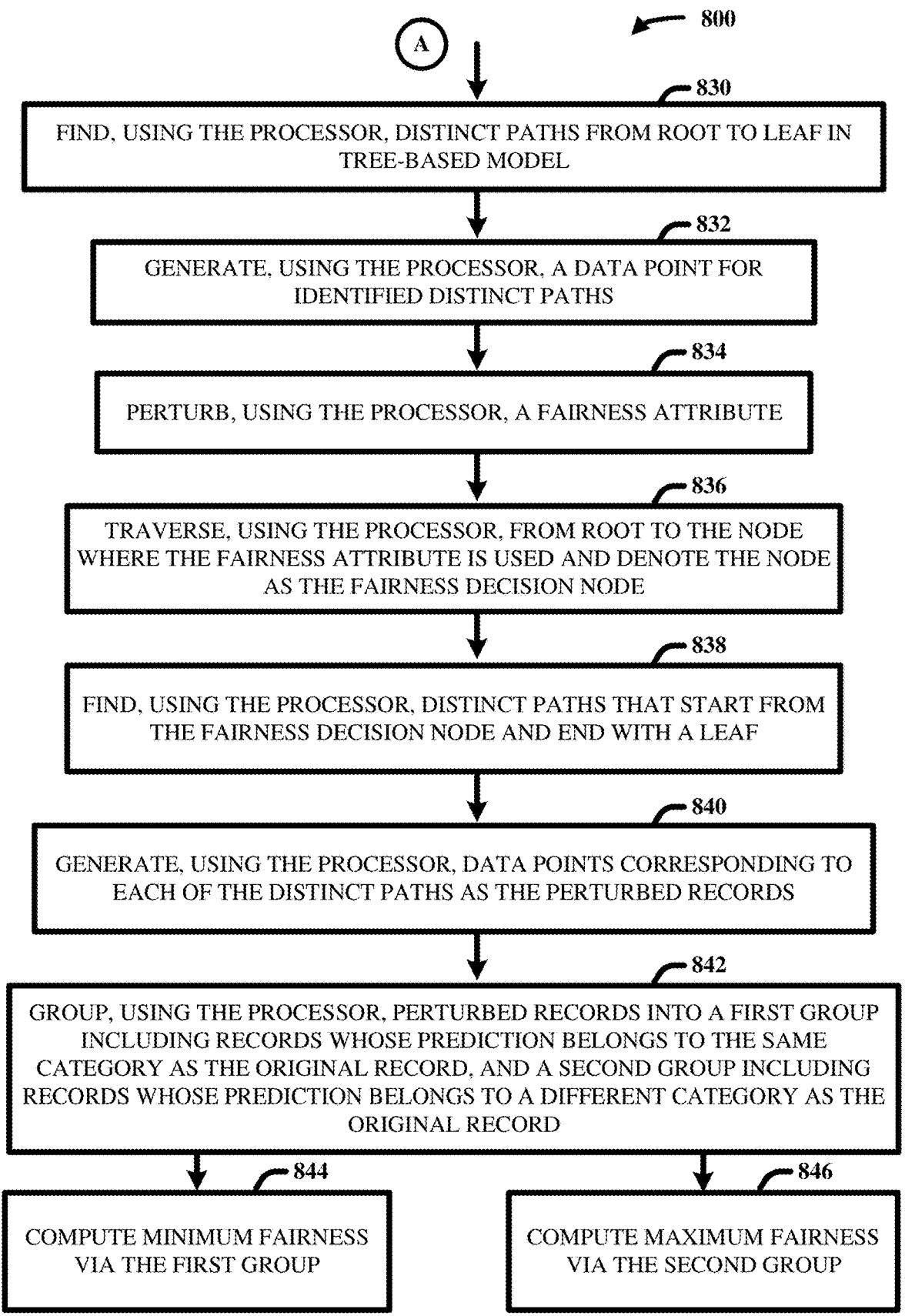

With embodiments, such as generally illustrated by FIG. 8C, the computer implemented method of evaluating sensitivity and fairness bounds of tree-based models 800 can comprise finding, using the processor, distinct paths from root to leaf in the tree-based model (step 830). Additionally, the computer-implemented method 800 can comprise: generating, using the processor 122, a data point for identified distinct paths (step 832); perturbing, using the processor, a fairness attribute (step 834); and traversing, using the processor 122, from root to the node where the fairness attribute is used and denote the node as the fairness decision node (step 836). The computer-implemented method 800 can further include finding, using the processor, distinct paths that start from the fairness decision node and end with a leaf (step 838).

In embodiments, the computer-implemented method 800 can comprise generating, using the processor 122, data points corresponding to each of the distinct paths as the perturbed records (step 840). The method can additionally include grouping, using the processor 122, perturbed records into a first group (including records whose prediction belongs to the same category as the original record) and a second group (including records whose prediction belongs to a different category as the original record) (step 842). The computer-implemented method of evaluating sensitivity and fairness bounds of tree-based models 800 includes computing minimum fairness with records that amplify bias via the first group 600A (step 844) and computing the maximum fairness with records that do not amplify bias via the second group 600B (step 846).

For example, one or more embodiments described herein of the sensitivity and fairness bound evaluation system 100 and/or one or more components thereof can employ one or more computing resources of the computing environment 900 described below with reference to the illustration 900 of FIG. 9. For instance, the system and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

A cloud computing environment is service oriented with a focus on statelessness, low coupling, modularity and/or semantic interoperability. At the heart of cloud computing is an infrastructure that includes a network of interconnected nodes.

Moreover, the sensitivity and fairness bounds evaluation system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, the sensitivity and fairness bounds evaluation system 100 can be employed to use hardware and/or software to solve problems that are highly technical in nature, that are not abstract and/or that cannot be performed as a set of mental acts by a human.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, the sensitivity and fairness bounds evaluation system 100 can further comprise various computer and/or computing-based elements described herein with reference to computing environment 900 and FIG. 9. In several embodiments, computer and/or computing-based elements can be used in connection with implementing one or more of the systems, devices, components and/or computer-implemented operations shown and described in connection with FIG. 1 or with other figures disclosed herein.

Memory 124 can store one or more computer and/or machine readable, writable and/or executable components and/or instructions that, when executed by processor 122 (e.g., a classical processor, a quantum processor and/or like processor), can facilitate performance of operations defined by the executable component(s) and/or instruction(s). For example, memory 124 can store computer and/or machine readable, writable and/or executable components and/or instructions that, when executed by processor 122, can facilitate execution of the various functions described herein relating to the fairness component 102, the identification component 104, the removal component 106, the evaluation component 108, and/or another component associated with the sensitivity and fairness bounds evaluation system 100 as described herein with or without reference to the various figures of the one or more embodiments.

Memory 124 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 124 are described below with reference to system volatile memory 912 and FIG. 9. These examples of memory 124 can be employed to implement any one or more embodiments described herein.

Processor 122 can comprise one or more types of processors and/or electronic circuitry (e.g., a classical processor, a quantum processor and/or like processor) that can implement one or more computer and/or machine readable, writable and/or executable components and/or instructions that can be stored at memory 124. For example, processor 122 can perform various operations that can be specified by computer and/or machine readable, writable and/or executable components and/or instructions including, but not limited to, logic, control, input/output (I/O), arithmetic and/or the like. In some embodiments, processor 122 can comprise one or more central processing units, multi-core processors, microprocessors, dual microprocessors, microcontrollers, System on a Chip (SOCs), array processors, vector processors, quantum processors and/or another type of processor. Additional examples of processor 122 are described below with reference to processor set 910 and FIG. 9. The examples of processor 122 can be employed to implement any one or more embodiments described herein.

The sensitivity and fairness bounds evaluation system 100, the fairness component 102, the identification component 104, the removal component 106, the evaluation component 108, the processor 122, the memory 124, and/or another component of system 100 as described herein can be communicatively, electrically, operatively and/or optically coupled to one another via system bus 120 to perform functions of system 100 and/or any components coupled therewith. System bus 120 can comprise one or more memory buses, memory controllers, peripheral buses, external buses, local buses, a quantum buses and/or another type of bus that can employ various bus architectures. The examples of system bus 120 can be employed to implement any one or more embodiments described herein.

The sensitivity and fairness bounds evaluation system 100 can comprise any type of component, machine, device, facility, apparatus and/or instrument that comprises a processor and/or can be capable of effective and/or operative communication with a wired and/or wireless network. All suitable such embodiments are envisioned. For example, the sensitivity and fairness bounds evaluation system 100 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

The sensitivity and fairness bounds evaluation system 100 can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In some embodiments, the sensitivity and fairness bounds evaluation system 100 can be coupled (e.g., communicatively, electrically, operatively, optically and/or the like) to one or more external systems, sources and/or devices (e.g., classical and/or quantum computing devices, communication devices and/or the like) via a network.

In some embodiments, a network 130 can comprise one or more wired and/or wireless networks, including, but not limited to, a cellular network, a wide area network (WAN) (e.g., the Internet), or a local area network (LAN). For example, the sensitivity and fairness bounds evaluation system 100, the fairness component 102, the identification component 104, the removal component 106, the evaluation component 108, can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, the sensitivity and fairness bounds evaluation system 100 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among the sensitivity and fairness bounds evaluation system 100 and external systems, sources and/or devices (e.g., computing devices, communication devices and/or the like).

The sensitivity and fairness bounds evaluation system 100 can comprise one or more computer and/or machine readable, writable and/or executable components and/or instructions that, when executed by processor 122 (e.g., a classical processor, a quantum processor and/or the like), can facilitate performance of one or more operations defined by such component(s) and/or instruction(s). Further, in numerous embodiments, any component associated with the sensitivity and fairness bounds evaluation system 100, as described herein with or without reference to the various figures of the one or more embodiments, can comprise one or more computer and/or machine readable, writable and/or executable components and/or instructions that, when executed by processor 122, can facilitate performance of one or more operations defined by such component(s) and/or instruction(s). For example, the fairness component 102, the identification component 104, the removal component 106, the evaluation component 108, and/or any other components associated with the sensitivity and fairness bounds evaluation system 100 as disclosed herein (e.g., communicatively, electronically, operatively and/or optically coupled with and/or employed by system 100), can comprise such computer and/or machine readable, writable and/or executable component(s) and/or instruction(s). Consequently, according to numerous embodiments, the sensitivity and fairness bounds evaluation system 100 and/or any components associated therewith as disclosed herein, can employ processor 122 to execute such computer and/or machine readable, writable and/or executable component(s) and/or instruction(s) to facilitate performance of one or more operations described herein with reference to system 100 and/or any such components associated therewith.

The sensitivity and fairness bounds evaluation system 100 can facilitate (e.g., via processor 122) performance of operations executed by and/or associated with the fairness component 102, the identification component 104, the removal component 106, the evaluation component 108, and/or another component associated with system 100 as disclosed herein. For instance, as described in detail below, the sensitivity and fairness bounds evaluation system 100 can facilitate via processor 122 (e.g., a classical processor, a quantum processor and/or the like): generating one or more language invariant signals; generating a complete query intent using the one or more language invariant signals; and/or processing the complete query intent to an executable backend query to facilitate multi-lingual query interpretation. As will be apparent from the below, one or more systems can be employed to facilitate zero-shot transfer of the one or more language invariant signals (e.g., such as to be independent of domain/language specific training).

In embodiments, the sensitivity and fairness bounds evaluation system 100 can include one or more fairness components 102, one or more identification components 104, one or more removal components 106, one or more evaluation components 108, one or more system buses 120, one or more processors 122, one or more memory/storage components 124, one or more networks 130, one or more input devices 132, and/or one or more computer applications 134. The fairness component 102, the identification component 104, the removal component 106, the evaluation component 108, can be connected with one or more machines comprised by the sensitivity and fairness bounds evaluation system 100. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

Figure 9:
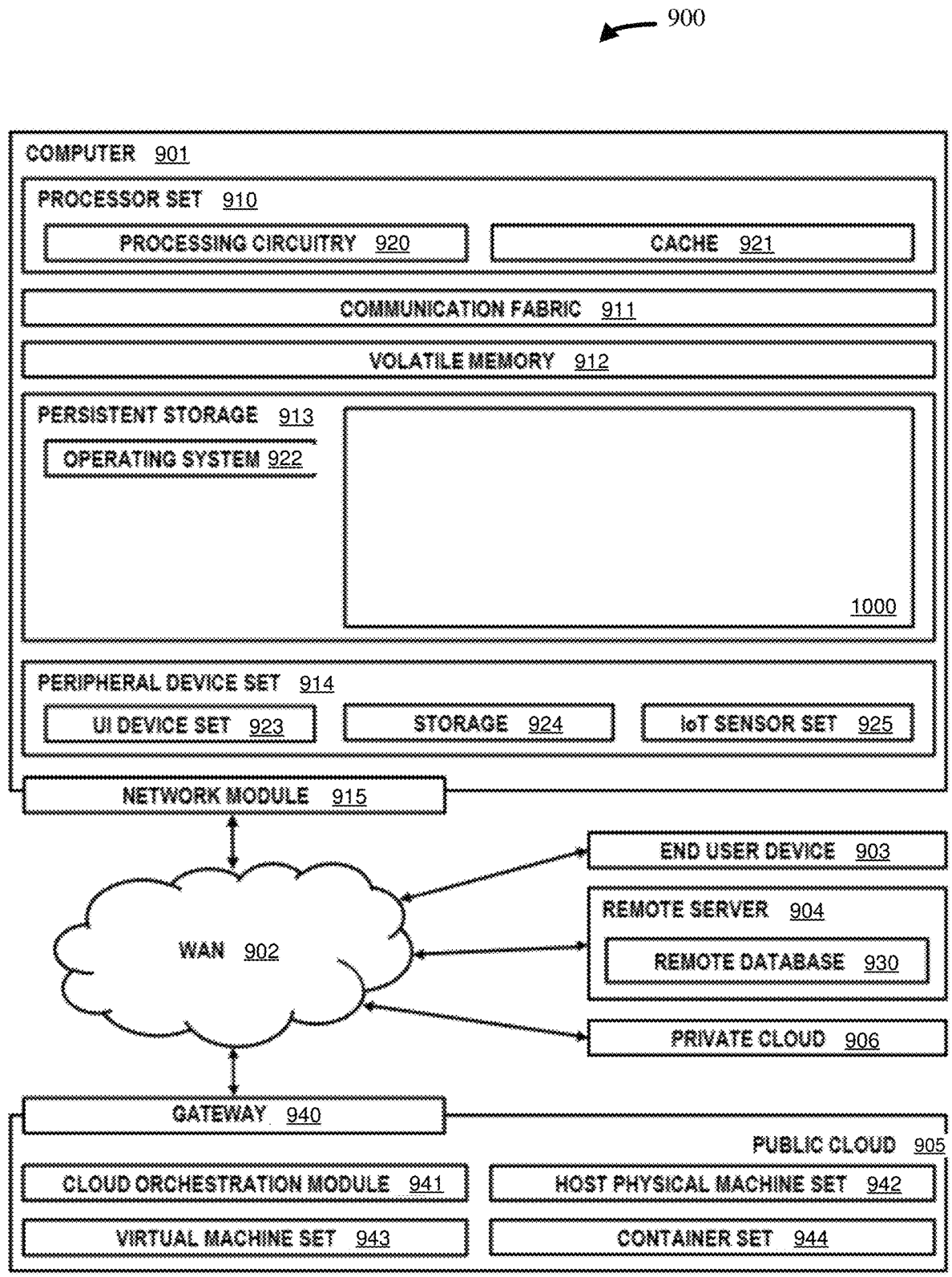
FIG. 9 illustrates a block diagram of an example, non-limiting operating environment in which one or more embodiments described herein can be facilitated.

Turning next to FIG. 9, the following discussion and associated figure are intended to provide a short general description of a suitable computing environment 900 in which one or more embodiments described herein at FIGS. 1-7 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as sensitivity and fairness bound evaluation code block 1000. In addition to block 1000, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 1000, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip."

In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 1000 in persistent storage 913.

COMMUNICATION FABRIC 911 is the signal conduction paths that allow the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface type operating systems that employ a kernel. The code included in block 1000 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components; and
   a processor, operably coupled to the memory, and that executes at least one of the computer executable components that:
      receives a dataset for a tree-based model being employed by users in a production environment, wherein the dataset comprises a group of records, wherein the group of records comprise a group of original records respectively comprising a group of input attributes and an output attribute generated by the tree-based model based on the group of input attributes, wherein the group of input attributes comprises an attribute designated as a fairness attribute;
      calculates a first fairness value of the dataset as a function of fairness attribute values of the fairness attribute and output values of the output attribute in the group of records;
      perturbs respective fairness attribute values of the fairness attribute for a subgroup of the group of original records to generate a group of perturbed records, wherein the group of records is updated to comprise the group of original records and the group of perturbed records;
      identifies respective root to leaf paths in the tree-based model for the records of the group of records;
      removes at least one record of the group of records having a respective root to leaf path that is same as a respective root to leaf path of another record of the group of records to generate an updated dataset from the dataset;
      calculates a second fairness value of the updated dataset based on the function of the fairness attribute values of the fairness attribute and the output values of the output attribute in the group of records of the updated dataset;
   evaluates a sensitivity of the tree-based model based on a difference between the first fairness value and the second fairness value and a fairness criterion; and
   based on a determination that the difference between the first fairness value and the second fairness value does not satisfy the fairness criterion, provides an alert to a user associated with the dataset that the tree-based model has generated one or more potentially biased output values for the output attribute for the dataset.

2. The system of claim 1, wherein the at least one of the computer executable components further:
   monitors a data drift of the tree-based model based on a determination that the tree-based model is sensitive to fairness.

3. The system of claim 2, wherein the group of perturbed records comprises a protected attribute that has changed in an opposite direction.

4. The system of claim 2, wherein the tree-based model is sensitive to fairness if the difference is above a set threshold.

5. The system of claim 4, wherein the at least one of the computer executable components further:
   identifies one or more perturbed records that amplify a bias of the tree-based model.

6. The system of claim 5, wherein the at least one of the computer executable components further:
   identifies one or more perturbed records that do not amplify the bias of the tree-based model.

7. The system of claim 6, wherein the at least one of the computer executable components further:
   determines a minimum fairness of the dataset via the group of records and the one or more perturbed records that amplify the bias of the tree-based model; and
   determines a maximum fairness of the dataset via the group of records and the one or more perturbed records that do not amply the bias of the tree-based model.

8. A computer implemented method, comprising:
   receiving, by a system comprising a processor, a dataset for a tree-based model being employed by users in a production environment, wherein the dataset comprises a group of records, wherein the group of records comprise a group of original records respectively comprising a group of input attributes and an output attribute generated by the tree-based model based on the group of input attributes, wherein the group of input attributes comprises an attribute designated as a fairness attribute;
   calculating, by the system, a first fairness value of the dataset as a function of fairness attribute values of the fairness attribute and output values of the output attribute in the group of records;
   perturbing, by the system, respective fairness attribute values of the fairness attribute for a subgroup of the group of original records to generate a group of perturbed records, wherein the group of records is updated to comprise the group of original records and the group of perturbed records;
   identifying, by the system, respective root to leaf paths in the tree-based model for the records of the group of records;
   removing, by the system, at least one record of the group of records having a respective root to leaf path that is same as a respective root to leaf path of another record of the group of records to generate an updated dataset from the dataset;
   calculating, by the system, a second fairness value of the updated dataset based on the function of the fairness attribute values of the fairness attribute and the output values of the output attribute in the group of records of the updated dataset;
   evaluating, by the system, a sensitivity of the tree-based model based on a difference between the first fairness value and the second fairness value and a fairness criterion; and
   based on a determination that the difference between the first fairness value and the second fairness value does not satisfy the fairness criterion, providing, by the system, an alert to a user associated with the dataset that the tree-based model has generated one or more potentially biased output values for the output attribute for the dataset.

9. The computer implemented method of claim 8, further comprising:
monitoring, using the processor, a data drift of the tree-based model based on a determination that the tree-based model is sensitive to fairness.

10. The computer implemented method of claim 9, wherein the group of perturbed records comprises a protected attribute that has changed in an opposite direction.

11. The computer implemented method of claim 10, wherein the tree-based model is sensitive to fairness if the difference is above a set threshold.

12. The computer implemented method of claim 11, further comprising:
identifying, by the processor, one or more perturbed records that amplify a bias of the tree-based model.

13. The computer implemented method of claim 12, further comprising:
identifying, by the system, one or more perturbed records that do not amplify the bias of the tree-based model.

14. The computer implemented method of claim 13, further comprising:
determining, by the system, a minimum fairness of the dataset via the group of records and the one or more perturbed records that amplify the bias of the tree-based model; and
determining, by the system, a maximum fairness of the dataset via the group of records and the one or more perturbed records that do not amplify the bias of the tree-based model.

15. A computer program product comprising a non-transitory computer readable medium having program instructions embodied therewith, the program instructions executable by a processor to cause the processor to:
receive a dataset for a tree-based model being employed by users in a production environment, wherein the dataset comprises a group of records, wherein the group of records comprise a group of original records respectively comprising a group of input attributes and an output attribute generated by the tree-based model based on the group of input attributes, wherein the group of input attributes comprises an attribute designated as a fairness attribute;
calculate a first fairness value of the dataset as a function of fairness attribute values of the fairness attribute and output values of the output attribute in the group of records;
perturb respective fairness attribute values of the fairness attribute for a subgroup of the group of original records to generate a group of perturbed records, wherein the group of records is updated to comprise the group of original records and the group of perturbed records;
identify respective root to leaf paths in the tree-based model for the records of the group of records;
remove, using the processor, at least one record of the group of records having similar a respective root to leaf path that is same as a respective root to leaf path of another record of the group of records to generate an updated dataset from the dataset;
calculate a second fairness value of the updated dataset based on the function of the fairness attribute values of the fairness attribute and the output values of the output attribute in the group of records of the updated dataset;
evaluate a sensitivity of the tree-based model based on a difference between the first fairness value and the second fairness value and a fairness criterion; and
based on a determination that the difference between the first fairness value and the second fairness value does not satisfy the fairness criterion, provide an alert to a user associated with the dataset that the tree-based model has generated one or more potentially biased output values for the output attribute for the dataset.

16. The computer program product of claim 15, wherein the program instructions further cause the processor to:
monitor a data drift of the tree-based model based on a determination that the tree-based model is sensitive to fairness.

17. The computer program product of claim 16, wherein the group of perturbed records comprises a protected attribute that has changed in an opposite direction.

18. The computer program product of claim 17, wherein the tree-based model is sensitive to fairness if the difference is above a set threshold.

19. The computer program product of claim 16, wherein the program instructions further cause the processor to:
identify one or more perturbed records that amplify a bias of the tree-based model; and
identify one or more perturbed records that do not amplify the bias of the tree-based model.

20. The computer program product of claim 19, wherein the program instructions further cause the processor to:
determine, using the processor, a minimum fairness of the dataset via the group of records and the one or more perturbed records that amplify the bias of the tree-based model; and
determine, using the processor, a maximum fairness of the dataset via the group of records and the one or more perturbed records that do not amplify the bias of the tree-based model.

* * * * *